(12) United States Patent
Tuli

(10) Patent No.: US 6,874,009 B1
(45) Date of Patent: Mar. 29, 2005

(54) PORTABLE HIGH SPEED INTERNET DEVICE WITH USER FEES

(76) Inventor: Raja Tuli, 1155 Rene Levesque West #3500, Mtl, QC (CA), H3B 3T6

(*) Notice: Subject to any disclaimer, the term of this patent is extended or adjusted under 35 U.S.C. 154(b) by 0 days.

(21) Appl. No.: 09/504,809

(22) Filed: Feb. 16, 2000

(51) Int. Cl.$^7$ .................. G06F 15/16; G06F 15/00; G06F 17/00; G06F 17/21; G06F 17/24
(52) U.S. Cl. .................. 709/203; 709/219; 715/513
(58) Field of Search .................. 709/203, 223, 709/224, 219; 715/513–515; 705/52, 53

(56) References Cited

U.S. PATENT DOCUMENTS

| | | |
|---|---|---|
| 4,899,394 A | 2/1990 | Lee |
| 5,161,213 A * | 11/1992 | Knowlton .................. 345/428 |
| 5,355,447 A * | 10/1994 | Knowlton .................. 345/670 |
| 5,379,057 A | 1/1995 | Clough et al. |
| 5,444,763 A | 8/1995 | Lazaridis et al. |
| 5,534,893 A | 7/1996 | Hansen, Jr. et al. |
| 5,546,524 A * | 8/1996 | Chow et al. .................. 345/782 |
| 5,546,538 A | 8/1996 | Cobbley et al. |
| 5,555,241 A | 9/1996 | Lazaridis et al. |
| 5,559,800 A | 9/1996 | Mousseau et al. |
| 5,581,243 A | 12/1996 | Ouellette et al. |
| 5,600,790 A | 2/1997 | Barnstijn et al. |
| 5,657,345 A | 8/1997 | Lazaridis |
| 5,682,525 A | 10/1997 | Bouve et al. |
| 5,699,255 A * | 12/1997 | Ellis et al. .................. 701/212 |
| 5,701,451 A | 12/1997 | Rogers et al. |
| 5,721,908 A | 2/1998 | Lagarde et al. |
| 5,727,159 A | 3/1998 | Kikinis |
| 5,758,110 A | 5/1998 | Boss et al. |
| 5,761,663 A | 6/1998 | Lagarde et al. |
| 5,764,235 A | 6/1998 | Hunt et al. |
| 5,765,176 A * | 6/1998 | Bloomberg .................. 715/514 |
| 5,768,483 A | 6/1998 | Maniwa et al. |
| 5,778,092 A | 7/1998 | MacLeod et al. |
| 5,793,964 A | 8/1998 | Rogers et al. |
| 5,802,312 A | 9/1998 | Lazaridis et al. |
| 5,809,415 A | 9/1998 | Rossmann |
| 5,810,680 A * | 9/1998 | Lobb et al. .................. 473/407 |

(Continued)

FOREIGN PATENT DOCUMENTS

| | | |
|---|---|---|
| EP | 0 833 260 | 1/1998 |
| EP | 0 889 402 A | 1/1999 |
| EP | 890922 A2 | 1/1999 |

(Continued)

OTHER PUBLICATIONS

Select pages from AT&T Wireless, Bell Atlantic Mobile, and Nextel, as delivered through the Wayback Machine, web.archive.org. 1997–1999.*

(Continued)

Primary Examiner—Rupal Dharia
Assistant Examiner—Melvin H Pollack
(74) Attorney, Agent, or Firm—Blakely, Sokoloff, Taylor & Zafman LLP

(57) ABSTRACT

The invention discloses a portable device that allows the user to access the Internet and World Wide Web. The portable device includes a modem that connects to a cellular telephone, thus the portable device connects wirelessly to the Internet. A host computer that may also be a Web server, is connected to the Internet and comprises various software programs to translate and compress into bit map or raster images the information received from the Internet. The compressed image is sent the portable device and the device is capable of decompressing the compressed image. Thus, the user views a bit map image of a Web page. The portable device further comprises methods of pointing and clicking on text and images which represent links to other pages. All commands that the user enters into the portable device are sent to the host computer, which performs the commands via a virtual browser, and sends the information back to the portable device. The user may also be charged fees for the purchase of the device as well as monthly fees for the usage.

22 Claims, 3 Drawing Sheets

U.S. PATENT DOCUMENTS

| | | | |
|---|---|---|---|
| 5,831,679 A * | 11/1998 | Montgomery et al. | 348/473 |
| 5,838,906 A | 11/1998 | Doyle et al. | |
| 5,845,076 A | 12/1998 | Arakawa | |
| 5,856,827 A | 1/1999 | Sudo | |
| 5,862,348 A | 1/1999 | Pedersen | |
| 5,867,662 A | 2/1999 | Riggs | |
| 5,884,014 A | 3/1999 | Huttenlocher et al. | |
| 5,884,056 A | 3/1999 | Steele | |
| 5,893,095 A | 4/1999 | Jain et al. | |
| 5,910,805 A | 6/1999 | Hickey et al. | |
| 5,915,250 A | 6/1999 | Jain et al. | |
| 5,923,736 A | 7/1999 | Shachar | |
| 5,925,103 A | 7/1999 | Magallanes et al. | |
| 5,928,324 A | 7/1999 | Sloan | |
| 5,938,737 A | 8/1999 | Smallcomb et al. | |
| 5,949,412 A | 9/1999 | Huntsman | |
| 5,949,875 A * | 9/1999 | Walker et al. | 702/78 |
| 5,956,716 A | 9/1999 | Kenner et al. | |
| 5,961,586 A | 10/1999 | Pedersen | |
| 5,961,603 A | 10/1999 | Kunkel et al. | |
| 5,966,135 A | 10/1999 | Roy et al. | |
| 5,974,441 A | 10/1999 | Rogers et al. | |
| 5,978,835 A * | 11/1999 | Ludwig et al. | 709/204 |
| 5,987,256 A | 11/1999 | Wu et al. | |
| 5,995,102 A | 11/1999 | Rosen et al. | |
| 5,995,105 A * | 11/1999 | Reber et al. | 345/835 |
| 6,003,065 A | 12/1999 | Yan et al. | |
| 6,006,105 A | 12/1999 | Rostoker et al. | |
| 6,006,231 A | 12/1999 | Popa | |
| 6,006,241 A | 12/1999 | Purnaveja et al. | |
| 6,008,836 A | 12/1999 | Bruck et al. | |
| 6,011,546 A * | 1/2000 | Bertram | 345/700 |
| 6,011,905 A | 1/2000 | Huttenlocher et al. | |
| 6,012,083 A * | 1/2000 | Savitzky et al. | 709/202 |
| 6,012,086 A | 1/2000 | Lowell | |
| 6,014,133 A | 1/2000 | Yamakado et al. | |
| 6,014,694 A | 1/2000 | Aharoni et al. | |
| 6,014,706 A | 1/2000 | Cannon et al. | |
| 6,016,535 A | 1/2000 | Krantz et al. | |
| 6,021,409 A | 2/2000 | Burrows | |
| 6,023,749 A | 2/2000 | Richardson | |
| 6,026,435 A | 2/2000 | Enomoto et al. | |
| 6,034,686 A | 3/2000 | Lamb et al. | |
| 6,035,281 A * | 3/2000 | Crosskey et al. | 705/14 |
| 6,047,047 A | 4/2000 | Aldridge et al. | |
| 6,049,539 A | 4/2000 | Lee et al. | |
| 6,049,821 A * | 4/2000 | Theriault et al. | 709/203 |
| 6,049,831 A | 4/2000 | Gardell et al. | |
| 6,052,130 A * | 4/2000 | Bardon et al. | 345/666 |
| 6,054,985 A * | 4/2000 | Morgan et al. | 345/804 |
| 6,057,857 A | 5/2000 | Bloomfield | |
| 6,065,057 A | 5/2000 | Rosen et al. | |
| 6,065,800 A | 5/2000 | Olson | |
| 6,067,571 A | 5/2000 | Igarashi et al. | |
| 6,072,483 A | 6/2000 | Rosin et al. | |
| 6,072,598 A | 6/2000 | Tso | |
| 6,073,168 A | 6/2000 | Mighdoll et al. | |
| 6,073,483 A | 6/2000 | Nitecki et al. | |
| 6,081,623 A | 6/2000 | Bloomfield et al. | |
| 6,084,584 A | 7/2000 | Nahi et al. | |
| 6,087,952 A * | 7/2000 | Prabhakaran | 340/693.5 |
| 6,092,107 A | 7/2000 | Eleftheriadis et al. | |
| 6,097,352 A * | 8/2000 | Zavracky et al. | 345/7 |
| 6,101,180 A | 8/2000 | Donahue et al. | |
| 6,104,392 A | 8/2000 | Shaw et al. | |
| 6,105,021 A | 8/2000 | Berstis | |
| 6,108,655 A | 8/2000 | Schleimer et al. | |
| 6,108,727 A | 8/2000 | Boals et al. | |
| 6,118,449 A | 9/2000 | Rosen et al. | |
| 6,118,899 A | 9/2000 | Bloomfield et al. | |
| 6,119,135 A | 9/2000 | Helfman | |
| 6,121,970 A | 9/2000 | Guedalia | |
| 6,125,209 A | 9/2000 | Dorricott | |
| 6,138,156 A * | 10/2000 | Fletcher et al. | 709/224 |
| 6,157,935 A | 12/2000 | Tran et al. | |
| 6,182,054 B1 * | 1/2001 | Dickinson et al. | 705/34 |
| 6,182,127 B1 | 1/2001 | Cronin, III et al. | |
| 6,185,625 B1 | 2/2001 | Tso et al. | |
| 6,192,393 B1 | 2/2001 | Tarantino et al. | |
| 6,195,667 B1 | 2/2001 | Duga et al. | |
| 6,201,611 B1 | 3/2001 | Carter et al. | |
| 6,219,465 B1 * | 4/2001 | Nacman et al. | 382/300 |
| 6,226,400 B1 * | 5/2001 | Doll | 382/163 |
| 6,233,541 B1 | 5/2001 | Butts et al. | |
| 6,243,761 B1 | 6/2001 | Mogul et al. | |
| 6,256,750 B1 | 7/2001 | Takeda | |
| 6,262,732 B1 * | 7/2001 | Coleman et al. | 345/835 |
| 6,263,347 B1 | 7/2001 | Kobayashi et al. | |
| 6,269,481 B1 | 7/2001 | Perlman et al. | |
| 6,282,294 B1 | 8/2001 | Deo et al. | |
| 6,285,461 B1 | 9/2001 | Fujii et al. | |
| 6,286,003 B1 | 9/2001 | Muta | |
| 6,295,059 B1 * | 9/2001 | Lentz et al. | 345/764 |
| 6,298,162 B1 * | 10/2001 | Sutha et al. | 382/234 |
| 6,304,928 B1 | 10/2001 | Mairs et al. | |
| 6,313,880 B1 * | 11/2001 | Smyers et al. | 348/552 |
| 6,317,781 B1 | 11/2001 | De Boor et al. | |
| 6,345,279 B1 * | 2/2002 | Li et al. | 707/104.1 |
| 6,356,283 B1 | 3/2002 | Guedalia | |
| 6,359,603 B1 | 3/2002 | Zwern | |
| 6,404,416 B1 | 6/2002 | Kahn et al. | |
| 6,411,275 B1 | 6/2002 | Hedberg | |
| 6,418,310 B1 | 7/2002 | Dent | |
| 6,424,369 B1 | 7/2002 | Adair | |
| 6,433,801 B1 * | 8/2002 | Moon et al. | 345/840 |
| 6,449,639 B1 | 9/2002 | Blumberg | |
| 6,466,198 B1 | 10/2002 | Feinstein | |
| 6,477,143 B1 * | 11/2002 | Ginossar | 370/230 |
| 6,480,710 B1 * | 11/2002 | Laybourn et al. | 455/406 |
| 6,487,597 B1 | 11/2002 | Horie et al. | |
| 6,535,743 B1 | 3/2003 | Kennedy, III et al. | |
| 6,536,043 B1 | 3/2003 | Guedalia | |
| 6,539,077 B1 * | 3/2003 | Ranalli et al. | 379/67.1 |
| 6,553,240 B1 | 4/2003 | Dervarics | |
| 6,553,412 B1 | 4/2003 | Kloba et al. | |
| 6,560,621 B2 | 5/2003 | Barile | |
| 6,564,250 B1 | 5/2003 | Nguyen | |
| 6,565,611 B1 | 5/2003 | Wilcox et al. | |
| 6,571,245 B2 | 5/2003 | Huang et al. | |
| 6,574,501 B2 | 6/2003 | Lambert et al. | |
| 6,598,087 B1 | 7/2003 | Dixon, III et al. | |
| 6,615,234 B1 | 9/2003 | Adamske et al. | |
| 6,631,247 B1 | 10/2003 | Motoyama et al. | |
| 6,674,445 B1 | 1/2004 | Chithambaram et al. | |
| 6,677,965 B1 | 1/2004 | Ullmann et al. | |
| 2001/0034770 A1 | 10/2001 | O'Brien | |
| 2001/0047441 A1 | 11/2001 | Robertson | |
| 2001/0052911 A1 | 12/2001 | Boyle et al. | |
| 2002/0015042 A1 | 2/2002 | Robotham | |
| 2002/0018234 A1 | 2/2002 | Fu et al. | |

FOREIGN PATENT DOCUMENTS

| | | |
|---|---|---|
| EP | 0 889 636 A 2 | 1/1999 |
| EP | 1 001 613 A | 5/2000 |
| EP | 1026578 A2 | 8/2000 |
| EP | 1043876 A2 | 10/2000 |
| EP | 1109113 A2 | 6/2001 |
| GB | 2347766 A | 9/2000 |
| WO | WO 97 30556 A | 8/1997 |
| WO | WO 97 38389 A | 10/1997 |
| WO | WO 98 40842 A | 9/1998 |

| | | |
|---|---|---|
| WO | WO 98 43177 A | 10/1998 |
| WO | WO 99 09658 A | 2/1999 |
| WO | WO 99/48007 | 9/1999 |
| WO | WO 0033232 A2 | 6/2000 |
| WO | WO 01 09836 A | 2/2001 |

OTHER PUBLICATIONS

Lewis, Ted. "Information Appliances: Gadget Netopia" Computer, vol. 31, issue 1, Jan. 1998, pp. 59–68.*

Cimini, Leonard J., Jr., et al. "Advanced Cellular Internet Service (ACIS)" IEEE Communications Magazine, vol. 36, Issue 10, Oct. 1998, pp. 150–159.*

Oliphant, Malcolm W. "The Mobile Phone Meets the Internet" IEEE Spectrum, vol. 36, Issue 8, Aug. 1999, pp. 20–28.*

Lind, R., et al. "The Network Vehicle—A Glimpse into the Future of Mobile Multi–Media", IEEE AES System Magazine, Sep. 1999, pp. 27–32.*

Gbaguidi, Constant, et al. "A Programmable Architecture for the Provision of Hybrid Services," IEEE Communications Magazine, vol. 37, Issue 7, Jul. 1999, pp. 110–116.*

Narayanaswamy, Shankar, et al. "User Interface for a PCS Smart Phone," IEEE Intl. Conference on Multimedia Computing and Systems, vol. 1, Jun. 1999, pp. 777–781.*

Rumba Technical Bulletin, "Configuring RUMBA LPR & LPD (16–bit)," 1996, from the web: 156.27.8.200/ts_rumba/solution/pdf/TCPIP/4002.pdf, pp. 1–11.

International Search Report, PCT/CA 02/00133, 3 pages, 2003.

International Search Report, PCT/CA 02/00048, 3 pages, 2003.

International Search Report, PCT/CA 01/01057, 2 pages, 2003.

Joel F. Bartlett, "Experience with a Wireless World Wide Web Client", Mar., 1995.

International Search Report, PCT/US 01/03382, 1 pages, 2001.

International Search Report, PCT/CA 01/00114, 3 pages, 2001.

International Search Report, PCT/CA 01/00126, 3 pages, 2001.

International Search Report, PCT/CA 01/00170, 4 pages, 2002.

International Search Report, PCT/CA 01/00169, 3 pages, 2002.

International Search Report, PCT/CA 02/00048, 5 pages, 2003.

Tagawa Norio, "Data Relay System and Data Repeater Applied to the System", Patent Abstracts of Japan, vol. 1997, No. 10, Jun. 24, 1997.

Armando Fox et al, "Experience with Top Gun Wingman: a proxy–based graphical web browser fro the 3Com PalmPilot", *Middleware*, IFIP International Conference on Distributed Systems, Platforms and Open Distributed Processing, Sep. 1998, pp. 407–424.

Richard Han, et al., "Dynamic Adaptation in an Image Transcoding Proxy for Mobile Web Browsing", *IEEE Personal Communication*, Dec., 1998, pp. 8–17.

Timothy Bickmore, et al., "Web Page Filtering and Re–Authoring for Mobile Users", *The Computer Journal*, vol. 42, No. 6, 1999.

Tristan Richardson, Quentin Stafford–Fraser, Kenneth R. Wood & Andy Hopper, "Virtual Network Computing", *IEEE Internet Computing*, vol. 2 No. 1, Jan./Feb. 1998 pp. 33–38.

Citrix Systems, Inc.: "Citrix Announces New Product and Product Enhancements that Speed Web Application", http://www.citrix.com/press/news/releases/20000905_product_enhance.asp, Sep. 5, 2000.

Boutell, T. et al., "PNG (Portable Network Graphics) Specification Version 1.0", RFC 2083, pp. 1–102, Mar. 1997.

Halfhill, T.R., "Good–Bye GUI . . . Hello, NUI," BYTE Magazine, www.byte.com, vol. 22, No. 7, pp. 60–64, 66, 68, 70, and 72, Jul. 1997.

Masinter, L., "Returning Values from Forms: multipart/form–data," RFC 2388, pp. 1–9, Aug. 1998.

Jao, C.S. et al., "The display of photographic–quality images on the Web: a comparison of two technologies," IEEE Transactions on Information Technology in Biomediciene, vol. 3, iss. 1, pp. 70–73, Mar. 1999.

Kaljuvee, O. et al., "Efficient Web form entry on PDAs," ACM Proceedings of the tenth International Conference on WWW, ACM Press, ISBN: 1–58113–348–0, pp. 663–672, May 2001.

* cited by examiner

PORTABLE HIGH SPEED INTERNET DEVICE WITH USER FEES

PRIOR ART

The background of the present invention includes U.S. Pat. No. 5,925,103, Internet Access Device which describes an improved Internet access system, vastly different from the present invention. Other prior art would include palm top computers and handheld computers that have limited processing power due to design restrictions. Thus, these computers are much slower for accessing the Internet and World Wide Web.

The present invention enhances the server's processing speed, data transfer and retrieval to and from the portable devices, with the aid of specialized embedded software in the server. The result is a cost effective Internet access solution.

SUMMARY

It is an object of the present invention to disclose a portable device that can access the Internet and World Wide Web, at extremely low costs. It is another object of the present invention to provide fast access to the Internet such that refreshing pages is quick and efficient.

The principal embodiment of the present invention discloses a portable device that comprises a modem that connects to a cellular telephone. Thus, the device has a wireless connection to the Internet. A host computer, which may also be a Web server connects directly to the Internet. The host computer comprises multiple software programs, for example a Browser Translator, which translates HTML images into black and white bit map or raster images. The compressed bit map or raster images are sent to the portable device, and the device decompresses the images. Thus, the user views a bit map image of a Web page.

The portable device comprises methods for pointing and clicking on text and images representing links to other Web pages. Clicking events are sent to the host computer that performs the commands via a virtual browser. The host computer then sends the required information to the portable device as a compressed image. The portable device decompresses the image and the user views a new page.

In a further embodiment, the server may also send a message to the device containing information pertaining to locations of links. Icons, graphics, or text that are already in bold, and which represent links to other Web sites must be conveyed to the user but it is difficult to represent such items in bold on the device. Thus, the server may transmit a message to the device containing the specification of all the areas that would constitute is a link on the page so that the palm top device would know where a link exists. Therefore, when a user passes the cursor over that area the cursor changes from an arrow to a hand. The user recognizes that the icon is a link and may therefore click upon it.

In another embodiment, the user may be charged a fee for the purchase of the device and may also charged a monthly fee for the use of the connection. This means that the user is charged by the minute (or per time period) for the connection to the server.

In a further embodiment the user could be charged a flat fee for an unlimited monthly connection.

In a further embodiment the user is charged by the amount of data that is transferred to him/her.

In a further embodiment, the user is charged a much smaller fee or not charged a fee at all but the fees collected by the server operator is collected from the telephone company that operates the cellular telephone the user uses. The cellular telephone company then may sell the device to user and would then benefit from the user using the cellular phone service. The cellular telephone company would normally charge the user a fee for his by the minute use of the phone.

DETAILED DESCRIPTION OF THE DRAWINGS

DETAILED DESCRIPTION OF THE PRESENT INVENTION

The principal embodiment of the present invention aims to provide a device that allows a user to access the Internet or the World Wide Web (WWW), which device is similar to a palm top computer. It is a further aim of the present invention, to reduce the cost of the device. It is a further aim of the present invention, is to increase the speed of refreshing the screen when the user clicks on a link and commands another page to be displayed. It is a further aim of the present invention to charge the user for the use of the invention.

Currently, existing palm top devices such as the Palm Pilot VII and Windows CE type devices contain an operating system, and within the operating system a mini-browser to interpret information received from the WWW or Internet and then display this information on the screen. This requires a powerful microprocessor.

Figure 1:
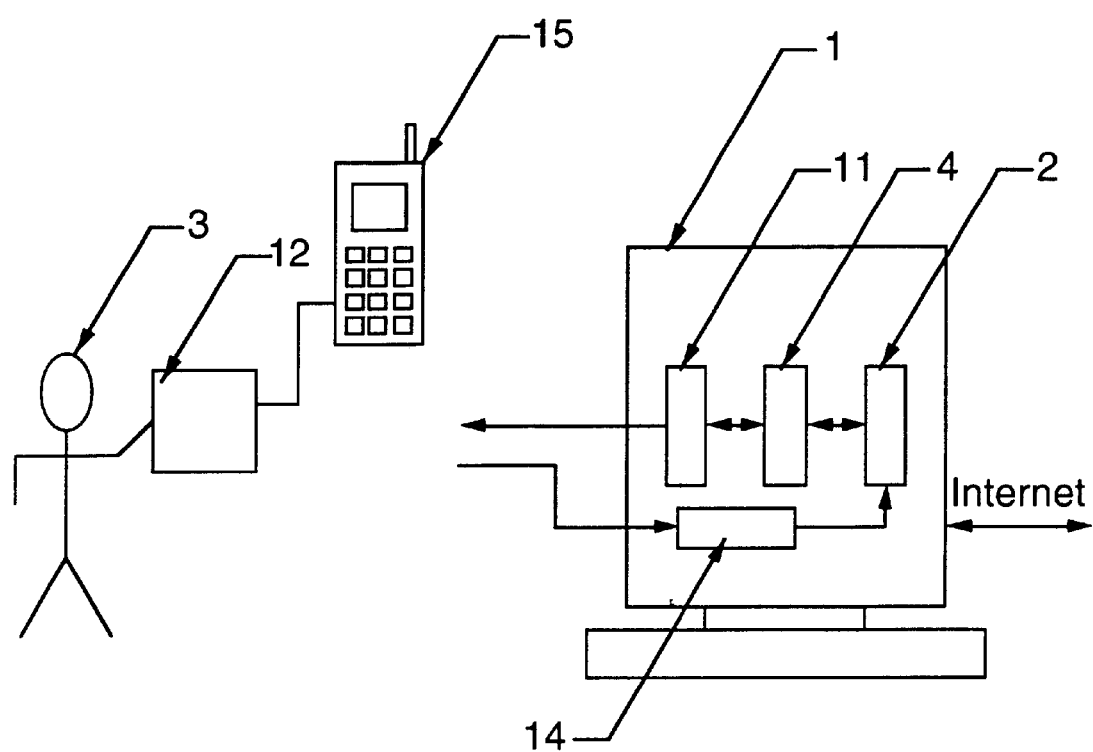
FIG. 1 illustrates block diagram of the host computer, the portable device with wireless connection and the user.
Figure 2:
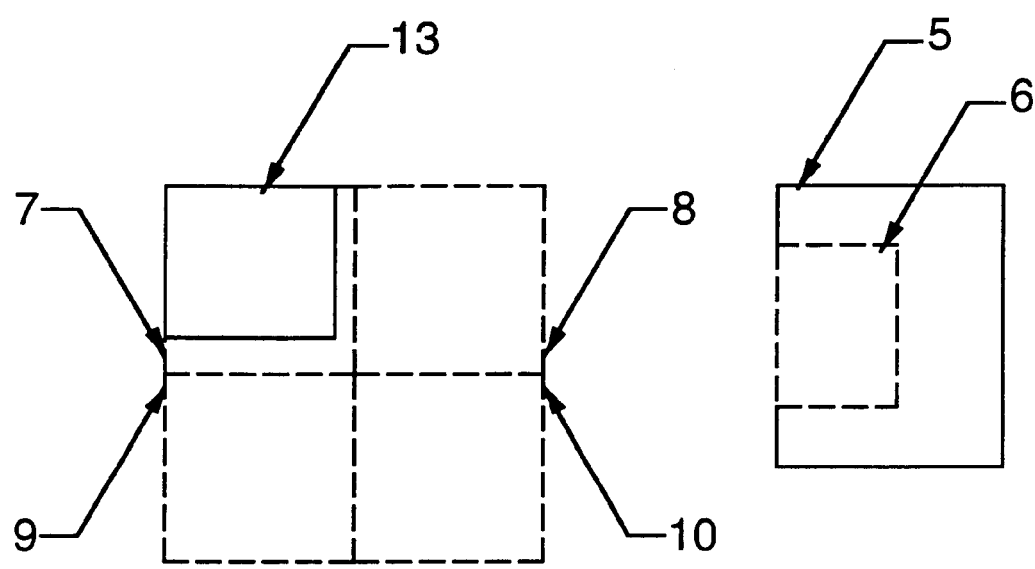
FIG. 2 illustrates portions of the image with respect to the displayable area.

The principal embodiment of the present invention is disclosed in FIG. 1. A host computer 1 is depicted that is connected to the Internet and may also be a Web server. Running in the host computer, is a Web server program 2. When a remote user 3 requests to view a Web page (or electronic message etc.) the Web server software receives HTML, JAVA, etc. information and transmits this information to another software, the Browser Translator 4. This software translates the information, (i.e. the entire image comprising graphics and text) received in the form of HTML, Java, etc. (information may be gathered from different sources) and translates it to a black and white bit map or raster image. In another embodiment, the software translates the information into a raster or color image. The image 5, as shown in FIG. 2, contains the information that would normally be displayed on a single Web page. The translation program therefore, also acts as a virtual browser 6. As can be seen in FIG. 2, the image 5 to be displayed in a browser window 6 is usually larger than the displayable area of the browser window 6.

Figure 3:
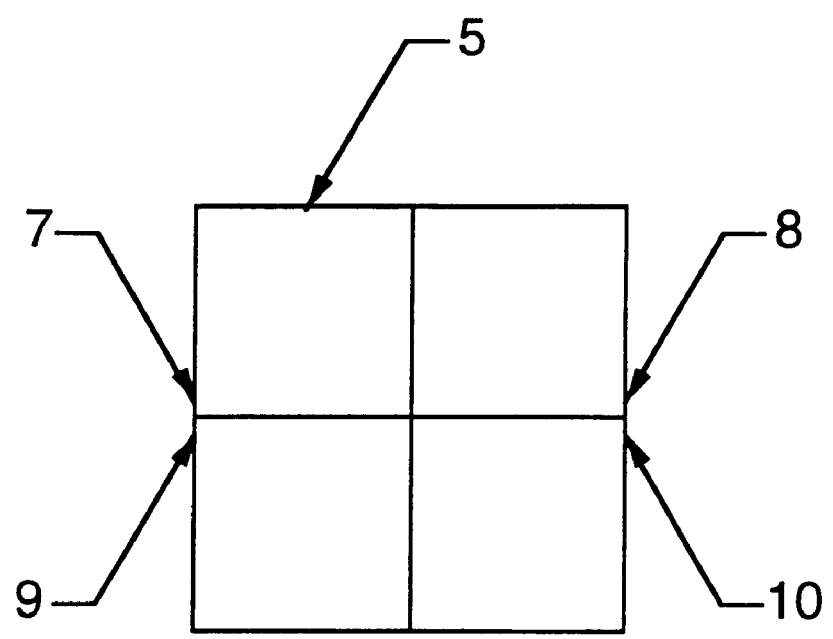
FIG. 3 illustrates sub-divisions of the image to be displayed.

The image 5 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the host computer 1 (FIG. 1), which compresses the image using a loss-less compression method. The compression method may be group 3 or group 4, or another method.

The programs 4 and 11 can have multiple instances running simultaneously on the host server for the purpose of connecting to multiple users. The compressed image, after being processed by program 11, is sent to the user, using a protocol in which information may be broken down into packets.

The information is received by a palm top device 12 that has the ability to display a monochrome image, in its display window 13. The information is decompressed and displayed in the order of priority such that part of image 7, which substantially or completely covers the displayable area 13 (FIG. 2), of the palm device is decompressed and displayed first and then sequentially the portions 8, 9, 10 of the image are decompressed and stored in an internal memory of the palm top device to be displayed later when the user scrolls up, down, or sideways to these parts of the image.

A CPU resident in the palm top device therefore has the ability to decompress a bit map or raster image that may be larger than the size of the display and allow the user to traverse this bit map or raster image. The primary method of traversing the image is through conventional scroll bars positioned at the sides of the image.

The resident CPU on the palm top device has no ability to determine which parts part or parts of the image, that is being displayed, represent links to other Web pages etc. Thus, the translator program 4 (FIG. 1) translates the image in the virtual browser 6 such that the words that represent links on the page 5 (FIG. 2) are translated to be slightly bolder. The user may therefore consider text that is bold to be links.

The palm top device provides the user with a pointing device. This pointing device may be a touch screen or tracking ball, etc. The palm top device also allows the user to click on specified areas. As soon as the user clicks on part of an image, the shape of the pointer changes from an arrow to an hourglass. A message is sent to the host computer, transmitting the location of the clicked down event. A program 14 interprets the message and provides a virtual click down in the virtual browser created in the translator program 4. If the user has pressed in an area of the image that does not represent a link or text box, a message is dispatched to the palm top device which immediately changes the hourglass shape of the pointer back to an arrow (in the case of a touch screen, from an hour glass to nothing). Further to this, if the user has clicked on a part of the image which represents a link, a new Web page is extracted from the Internet or WWW, translated by translator program 4 (FIG. 1) into a bit map or raster, and compressed by compression program 11 and dispatched to the palm top device where a new page is displayed. In a further embodiment, the image 5 may be continuously updated and translated and sent to the palm top device where it is continuously being refreshed. This occurs once every few seconds. In the principle embodiment therefore, the server only responds, i.e. it only refreshes the screen when the user clicks on a link or on a text box.

A

In a further embodiment, the server may also send a message to the device containing information pertaining to locations of links. For example, icons, graphics, or text that is already in bold, representing links to other Web sites must be conveyed to the user but it is difficult to represent such items in bold on the device. Thus, the server may transmit a message to the device containing the specification of all the areas that would constitute a link on the page so that the palm top device would know where a link exists. So when a user passes the cursor over that area the cursor changes from an arrow to a hand. The user recognizes that the icon is a link and may therefore click upon it. The cursor changes to an hourglass and a message is sent to the server transmitting the location of the clicked down event. A program 14 interprets the message and provides a virtual click down in the virtual browser created in the translator program 4. A new Web page is extracted from the Internet or WWW, translated by translator program 4 (FIG. 1) into a bit map or raster, and compressed by compression program 11 and dispatched to the palm top device where a new page is displayed.

When the user clicks in a text box or in a box in the display area into which letters or numbers must be input, the cursor first changes into an hourglass, and a message is sent to the host server. The host server recognizes that the click down event has occurred in the text box, and sends a message back to the palm top device to inform the palm top device to pop-up a keyboard on part of the screen. The user then types, using the pointer, the letters or words to be entered into the text box and presses "enter" or "go". The keyboard then disappears and the cursor changes back to an hourglass shape (in another embodiment, the keyboard could be replaced with a real keyboard or with an area that recognizes users' handwriting). The information typed into the text box is transmitted in a message to the host computer. The host computer enters the information into a text box in the virtual browser.

The user sees, after a short pause, as the image is refreshed on the palm top device, that the words, or letters or numbers have been entered into the text box. Further to this, the host computer may also break up the image such that the portion that has been changed, i.e. the text box area, is sent first.

In another embodiment of the present invention, images are only refreshed when as event occurs such as a mouse down event on a link or in a text box.

In a further embodiment only those portions of the image that changes may be transmitted from the host computer to the palm top device. Other images in the virtual browser that are continuously changing, such as banner advertisements, may be the only other images sent to the palm top computer as they change.

In a further embodiment, the server may also send a message to the palm top device, together with the raster black and white image and the message containing the link areas, a message containing the location and area of the text boxes. In this case when the user clicks in a text box, the device realizes that the user intends to input text and provides him with a keyboard on the screen (or other means disclosed earlier). After the user enters the text, the message is sent to the server in the normal fashion described earlier.

In the principal embodiment, the palm top device also contains a modem, which can be linked to the user's mobile telephone 15 and information that is communicated between the palm top device and the host computer is sent and received wirelessly through the mobile telephone.

Furthermore, the palm top device only contains enough memory to store the current displayable page. When the user presses a back or forward button, a message is sent to the host server, and the host server sends the reference page. The back and forward buttons etc. may be hard wired into the palm top device, or may be part of the display area.

Further to this, part of the image representing buttons (and other things) on the virtual browser may be sent as part of the compressed image and buttons such as forward and back may be treated the same way as links are handled as previously described. In the principle embodiment therefore the back and forward buttons are hard coded as part of the device.

In another embodiment, the palm top device comprises a modem that permits the device to connect to a cellular telephone 15 in digital format.

In another embodiment, the connection to the cellular telephone 15 is made through an analog modem connected to an ear jack of the cellular telephone.

In yet another embodiment of the present invention, the modem is replaced by an analog modem that has the capability to be connected to a landline providing a standard 56 kbps-type connection.

Further embodiments may provide connections through ISDN, cable modems etc.

In a further embodiment, the palm top device may contain a large screen to be used in a fashion similar to a home Internet appliance.

In a further embodiment, the image transferred between the host computer and the remote device (previously the palm top device) may be a color image and the compression method used may be of a Jpeg or other compression methods used for color images. A gray scale image may also be used to reduce bandwidth or display costs.

In a further embodiment, the device includes no screen, but only outputs to be hooked to a television screen or external monitor for display.

The remote device in the principal embodiment only has the ability to decompress the image it receives; display the image it receives; allow the user to scroll through the image; provide the user with a pointing device to point and click on the image; send messages providing location of click down event; provide the user with a method to input letters and numbers; send a message containing these letters and numbers.

The principal embodiment contains no other structured or intelligent information about the image.

Furthermore a model is described where a user is charged for the use of the device and the service.

In the principle embodiment of the present invention, the user is charged a fee for the purchase of the device. The user is than also charged a monthly fee for the use of the connection. This means that the user is charged by the minute (or per time period) for the connection to the server.

In a further embodiment the user could be charged a flat fee for an unlimited monthly connection.

In a further embodiment the user is charged by the amount of data that is transferred to him/her.

In a further embodiment, the user is charged a much smaller fee or not charged a fee at all but the fees collected by the server operator is collected from the telephone company that operates the cellular telephone the user uses. The cellular telephone company then may sell the device to user and would then benefit from the user using the cellular phone service. The cellular telephone company would normally charge the user a fee for his by the minute use of the phone.

What is claimed is:

1. A method to operate a server for serving documents to a remote device, the method comprising:
   a. Receiving, at the server, a request for a remote document from the remote device;
   b. Rendering the entire remote document into a first image;
   c. Dividing the first image into a plurality of sections;
   d. Compressing the plurality of sections into a plurality of compressed sections respectively;
   e. Transmitting the plurality of compressed sections to the remote device in a sequence according to a display priority; and
   f. Charging a fee for a connection to the server from the remote device, the server rendering an entire web page having links and text in a non-image format into an image in an image format, the image being transmitted in a compressed format through the connection to the remote device for display when the server receives a request for the web page from the remote device, the image being larger than a display area of the remote device.

2. A method as in claim 1 further comprising:
receiving consideration for the fee.

3. A method as in claim 1 wherein a user making the connection is charged a monthly fee.

4. A method as in claim 3 wherein the monthly fee is for unlimited monthly access.

5. A method as in claim 1 wherein the fee charged is based on a time period for the connection.

6. A method as in claim 1 wherein the fee charged is based on an amount of data that is transferred.

7. A method as in claim 1 wherein the connection comprises a telephone connection; and, the fee is collected from a telephone company by an operator of the server.

8. A method as in claim 1 further comprising:
   receiving a message from the remote device, the message indicating that a user input is provided to the remote document; and
   applying the user input to the remote document at the server.

9. A method as in claim 8 wherein the message indicates that a link of the remote document is clicked; and said applying comprises:
   retrieving a linked document pointed at by the link to serve the linked document to the remote device.

10. A method as in claim 1 wherein said rendering comprises:
    reducing a color depth to generate the first image from the remote document.

11. A method as in claim 10 wherein the first image is a black and white image reduced from the remote document.

12. A method as in claim 1 further comprising:
    receiving at the server the remote document from a remote server before said rendering.

13. A method as in claim 1 wherein the plurality of compressed sections are transmitted to the remote device through a wireless telecommunication link.

14. A method as in claim 1 wherein the remote device is capable of scrolling, at exclusive control of the remote device, the image for displaying in the display area of the remote device.

15. A method as in claim 1 wherein the web page has first displayable information in a non-image format; and, the image includes the first displayable information.

16. A method as in claim 15 wherein the first displayable information comprises at least one of:
    a) text; and
    b) Java.

17. A method as in claim 16 wherein the web pages further has at least one of:
    a) icons;
    b) graphics; and
    c) text box.

18. A method as in claim 1 wherein the server further sends location information to the remote device; and, wherein the location information specifies in the image at least one location at which a user input can be accepted at the remote device for an operation at the server with respect to the document.

19. A method as in claim 18 wherein the at least one location comprises a location of one of:
    a) a link to a document; and
    b) a text box.

20. A method as in claim 1 wherein the fee is charged for the connection to the server to obtain a service including rendering the entire web page having links and text in the non-image format into the image in the image format.

21. A method as in claim 20 wherein the image format is based on bitmap.

22. A method as in claim 21 wherein the links and the text in the non-image format is in HTML (HyperText Markup Language).

* * * * *